United States Patent [19]

Miyagawa

[11] Patent Number: 4,770,957
[45] Date of Patent: Sep. 13, 1988

[54] HANDLE ATTACHMENT CONSTRUCTION FOR A STORAGE BATTERY COVER

[75] Inventor: Shiro Miyagawa, Suita, Japan

[73] Assignee: Miyagawa Kasei Industry Co., Ltd., Osaka, Japan

[21] Appl. No.: 105,393

[22] Filed: Oct. 5, 1987

[51] Int. Cl.[4] .............................................. H01M 2/10
[52] U.S. Cl. ...................................... 429/175; 429/187
[58] Field of Search .................................. 429/187, 175

[56] References Cited

U.S. PATENT DOCUMENTS 3,910,800 10/1975 Groby et al. ......................... 429/187
4,693,949 9/1987 Kellett et al. ......................... 429/175

FOREIGN PATENT DOCUMENTS 2428835 3/1975 Fed. Rep. of Germany ...... 429/187
53-534 6/1978 Japan .
25496 6/1981 Japan .
0189453 11/1982 Japan ................................... 429/187

Primary Examiner—Donald L. Walton
Attorney, Agent, or Firm—W. G. Fasse; D. H. Kane, Jr.

[57] ABSTRACT

A handle (5, 5a) is turnably attached to a lid (1) which closes an opening in a battery casing (20). The handle is made of resin and is connected to the upper surface of the lid through a hinge (9, 9a) consisting of a thin-walled bendable portion. The upper surface of the lid is formed with a recess (11, 11a) for receiving the handle as the latter is lowered to extend along the upper surface of the lid when the handle is not used.

6 Claims, 7 Drawing Sheets

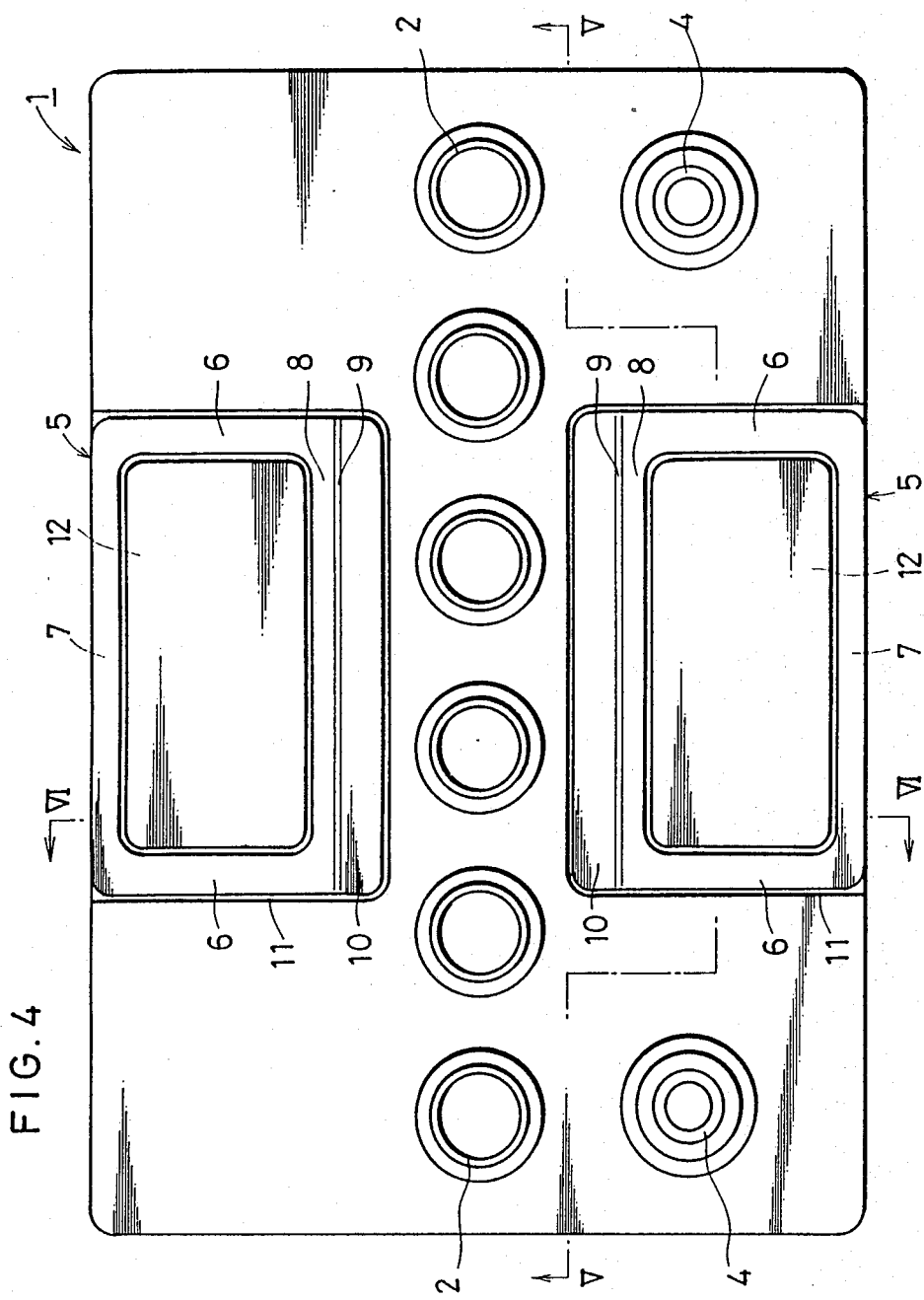

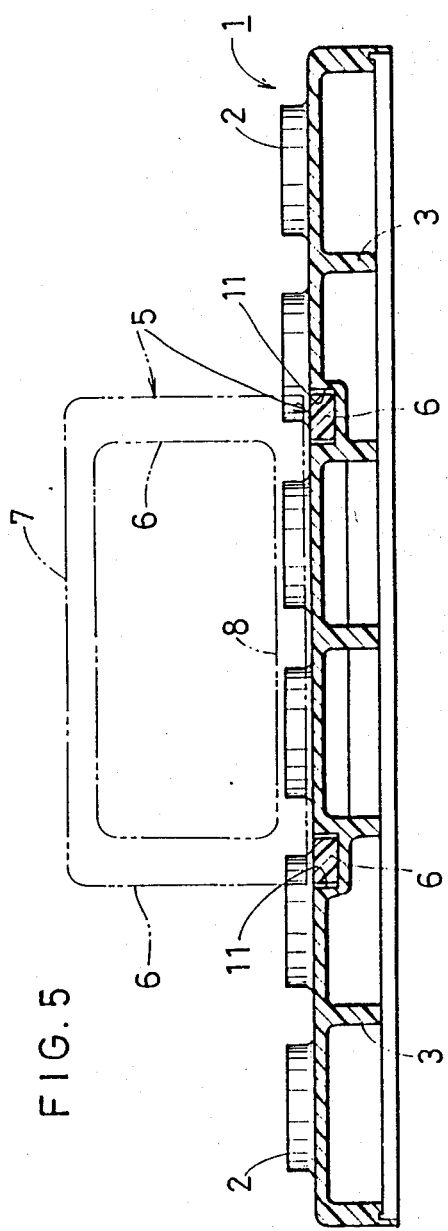
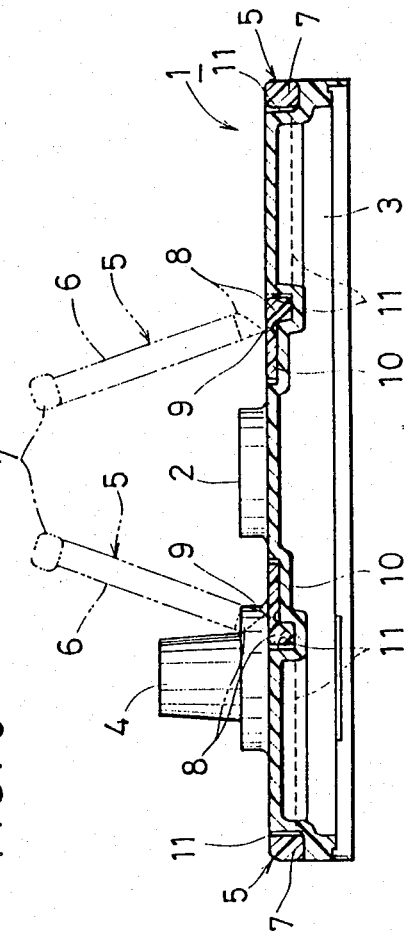

HANDLE ATTACHMENT CONSTRUCTION FOR A STORAGE BATTERY COVER

BACKGROUND OF THE INVENTION

1. Field of the Invention

This invention relates to a storage battery cover having a handle turnably attached to a lid body which closes the opening in a battery casing, and particularly it relates to a construction which makes such handle turnable.

2. Description of the Prior Art

A handle is often attached to a storage battery for conveniently lifting or carrying the storage battery.

Such handle is needed only when the storage battery is carried by hand, and in other situations the present of the handle often forms a hindrance. Therefore, it is desirable that the handle have a form which is not bulky when it is not used.

Thus, if a handle is made turnable when it is attached to the lid of a storage battery, the handle can be raised only when necessary and lowered when it is not used. Therefore, as one means which satisfies said desires, it may be contemplated to turnably attach a handle to the lid. A storage battery equipped with a handle thus made turnable is disclosed, for example in Japanese Utility Model Publication No. 78534/1978.

In this prior art, support pins are installed on opposite sides of the lid of a battery casing, said support pins being inserted in attachment holes in the opposite ends of a handle, so that the handle is turnable around the support pins, the arrangement being such that when the handle is not used, it can be lowered to extend along the lid. Particularly in the prior art disclosed in the above publication, the peripheral edge of the lid has a receiving step portion for receiving the handle when the latter is not used, and the pins installed in the lid are provided with slip-off preventive elements.

On the other hand, there is an arrangement wherein a handle is turnably attached to a lateral surface of the battery casing of a storage battery. And to make such handle turnable, the handle is made of resin and the flexibility of the resin is utilized to make the handle bendable through a thin-walled hinge; such handle attachment construction is described, for example, in Japanese Utility Model Publication No. 25496/1981.

In this second prior art, a pair of handles is installed on a pair of opposed outer lateral surfaces of a battery casing. When the handles are to be used, they are raised to extend along the lateral surfaces of the battery jar, with the grips of the handles projecting above the upper surface of the lid, but when the handles are not used, they extend downwardly along the outer lateral surfaces of the battery casing.

However, the two prior art references described above have the following problems.

In the first mentioned reference, in connection with the operation for attaching the handle to the support pins, a relatively complicated procedure of inserting the support pins into the respective attachment holes is involved, so that automation cannot be made so easily.

As for a problem about molding, it is impossible or very difficult to integrally mold a lid as by injection molding which, while being formed with a receiving step portion, is provided with laterally projecting support pins which are formed with slip-off preventive elements. Therefore, actually, support pins would be prepared separately from the lid and then attached to the lid. However, it is difficult to attach the support pins to the lid accurately at the predetermined positions on the lid. If the positions of the support pins are deviated, it sometimes happens that the handle, when lowered, cannot properly fit the receiving step portion.

Further, the rotatable or hingeable construction for a combination of support pins and attachment holes requires a relatively large space, resulting in an increase in the size of the battery casing for the storage battery.

Next, in the second reference mentioned above, the handles are attached so that they project beyond the outer lateral surfaces of the storage battery; thus, in the case where a plurality of such storage batteries are used as they are arranged side by side, the presence of such handles inevitably forms dead spaces. Further, when the storage battery is received in receiving means such as a box, the handles form an obstacle to the reception of the battery in the box so that it becomes necessary to increase the size of the receiving box.

In the case where a plurality of storage batteries are arranged side by side or a storage battery is put in a receiving box, as described above, it is more desirable from the standpoint of making the receiving box compact to place the handle directed downward along the lateral surface of the battery jar than to place it upright projecting above the upper surface of the storage battery. However, if there is not so much room around the location where the storage battery is to be placed, there can be a case where the handle cannot be directed downwardly after the storage battery has been placed in its operating location unless the handle is directed downwardly even during a series of movements starting with the lifting of the storage battery by the handle and ending with the placing of the battery in its predetermined operating location. Next, where the storage battery is to be lifted from a predetermined location, there arises another inconvenience in that the handle cannot be used from the start unless there is enough room around the storage battery to direct the handle upwardly. In the situations described above, even if a handle is attached to the storage battery, unfortunately the handle cannot be used effectively.

Further, in the case where handles are attached to opposed outer lateral surfaces of the battery casing of a the handles have to be respectively held by both hands before the storage battery can be lifted horizontal; thus, a man can carry only one storage battery at a time.

SUMMARY OF THE INVENTION

According to, the invention it is intended to simultaneously solve the problems set forth above by providing a storage battery having a handle wherein the handle attaching operation is easy and the construction for making such handle attachment construction turnable or hingeable is very simple and the handle can be manipulated all the time and carried by one hand even if there is no room whatsoever around the storage battery.

The invention is a storage battery cover having a handle turnably attached to a lid body which closes an opening in a battery casing, and the various technical matters described above are solved as follows.

Said handle is characterized in that it is made of resin and that it is connected to the upper surface of said lid body through a hinge consisting of a thin-walled portion which is made bendable.

According to the invention, the handle is connected to the upper surface of a lid through a hinge constructed as a thin-walled portion which utilizes the flexibility possessed by the resin of which the handle is made. Therefore, such handle is made turnable by the hinge. Since the construction employed to make the handle turnable is simply a hinge, there is almost no need for a space into which the hinge construction must fit, and the need for enlarging the battery casing of the storage battery is eliminated.

Further, it is very easy to form a thin-walled portion which provides a hinge for hinging the handle. The operation for attaching or forming such handle can be easily automated.

Further, since the handle is attached to the upper surface of the lid body, even if there is no room around the storage battery, there is no trouble caused to the operation of the handle and, moreover, the storage battery can be carried by one hand.

Therefore, even when the location for receiving the storage battery has no excess room with respect to the volume of the storage battery, the operation for lifting the storage battery from such a location or placing the battery into such a location can be carried out extremely efficiently by one hand holding the handle, and if both hands are used, two storage batteries can be handled at a time.

Further, according to the handle attachment construction of the invention, since the handle is hingeable or turnable, it is possible to raise the handle only when the handle is required and to lower it into a recess in the lid body when it is not required.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a plan view of a lid body for a storage battery showing a second embodiment of the invention;

FIG. 5 is a sectional view taken along the line V—V in FIG. 4;

FIG. 6 is a sectional view taken along the line VI—VI in FIG. 4;

DETAILED DESCRIPTION OF PREFERRED EXAMPLE EMBODIMENTS AND OF THE BEST MODE OF THE INVENTION

Figure 1:
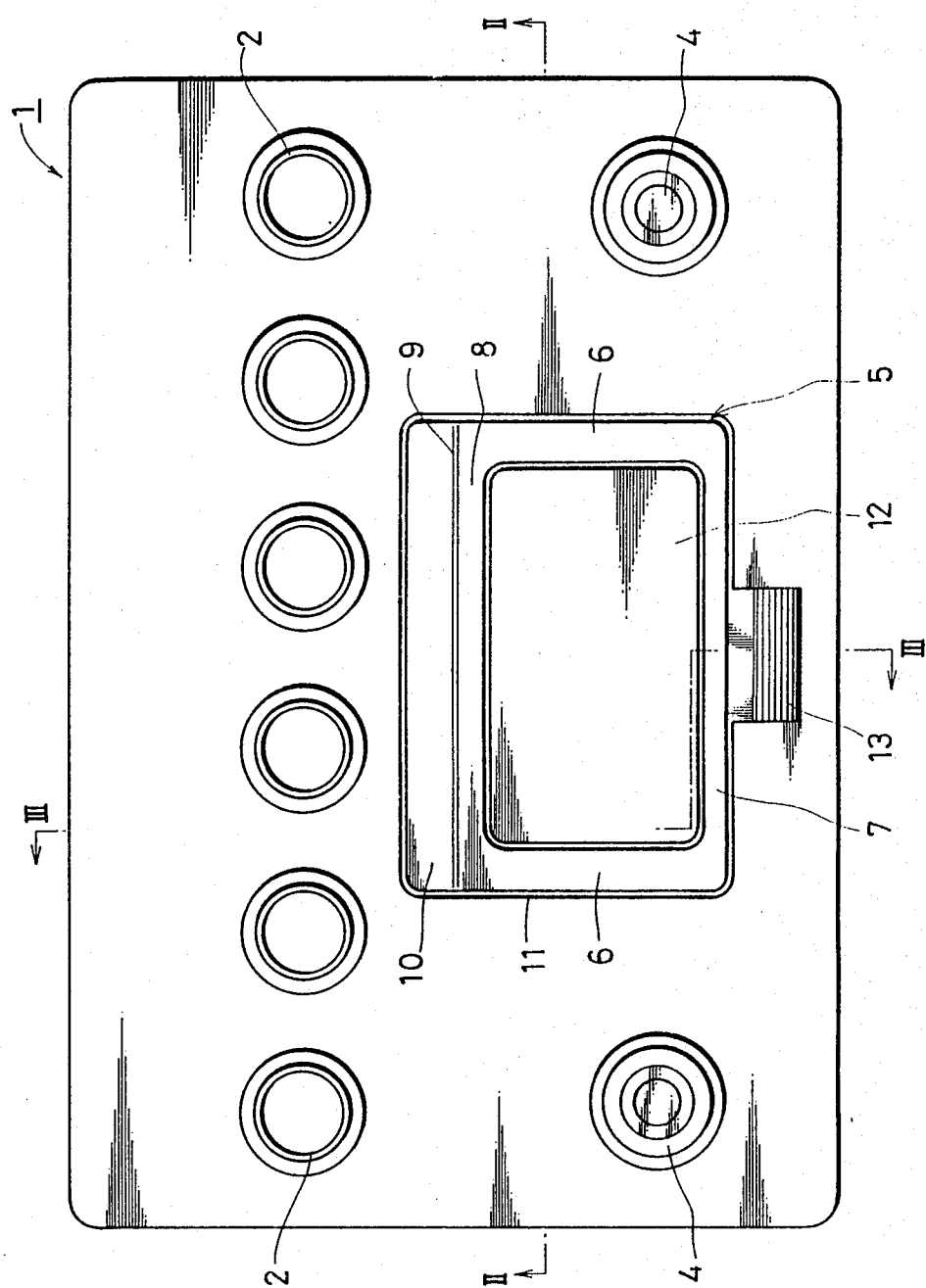
FIG. 1 is a plan view of a lid body for a storage battery employing a first embodiment of the invention.
Figure 2:
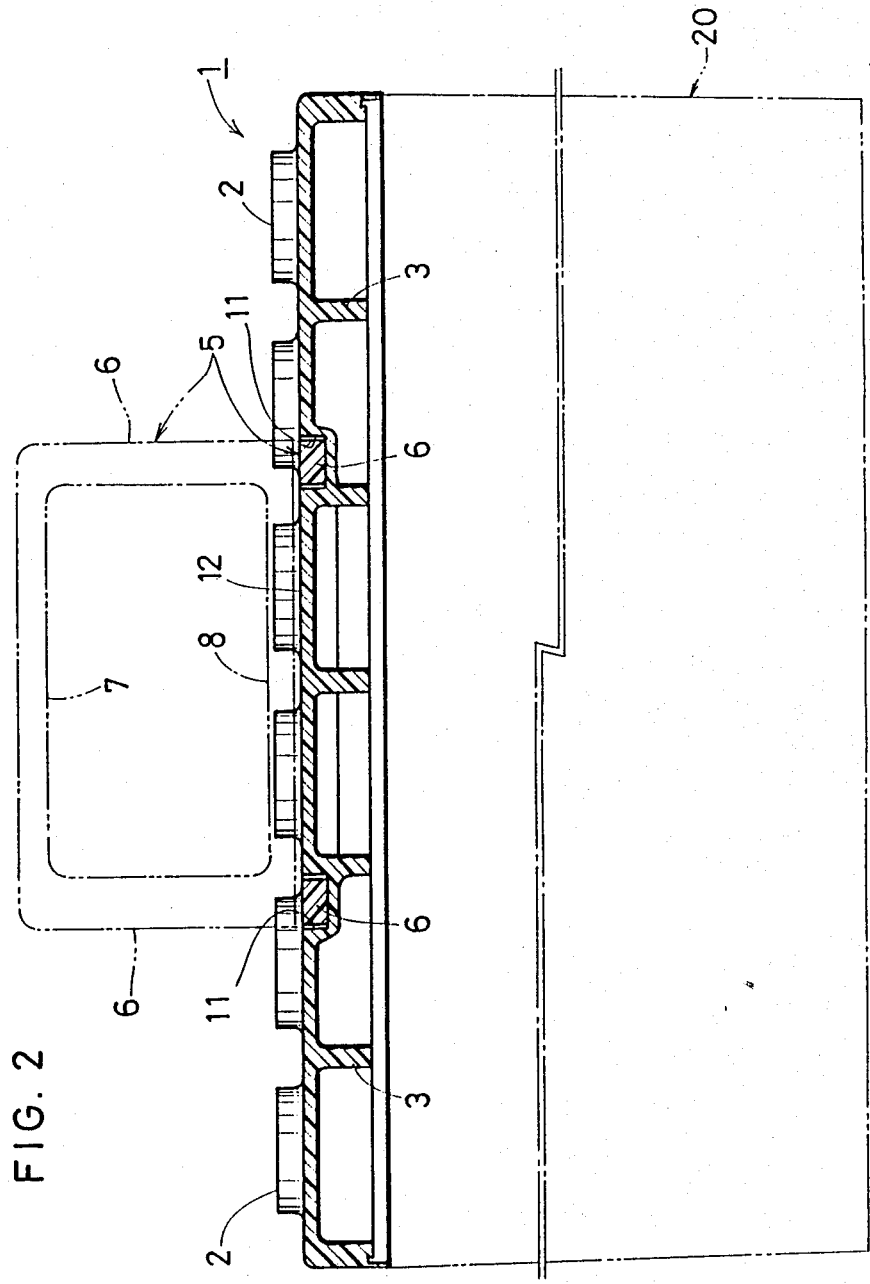
FIG. 2 is a sectional view taken along the line II—II in FIG. 1.
Figure 3:
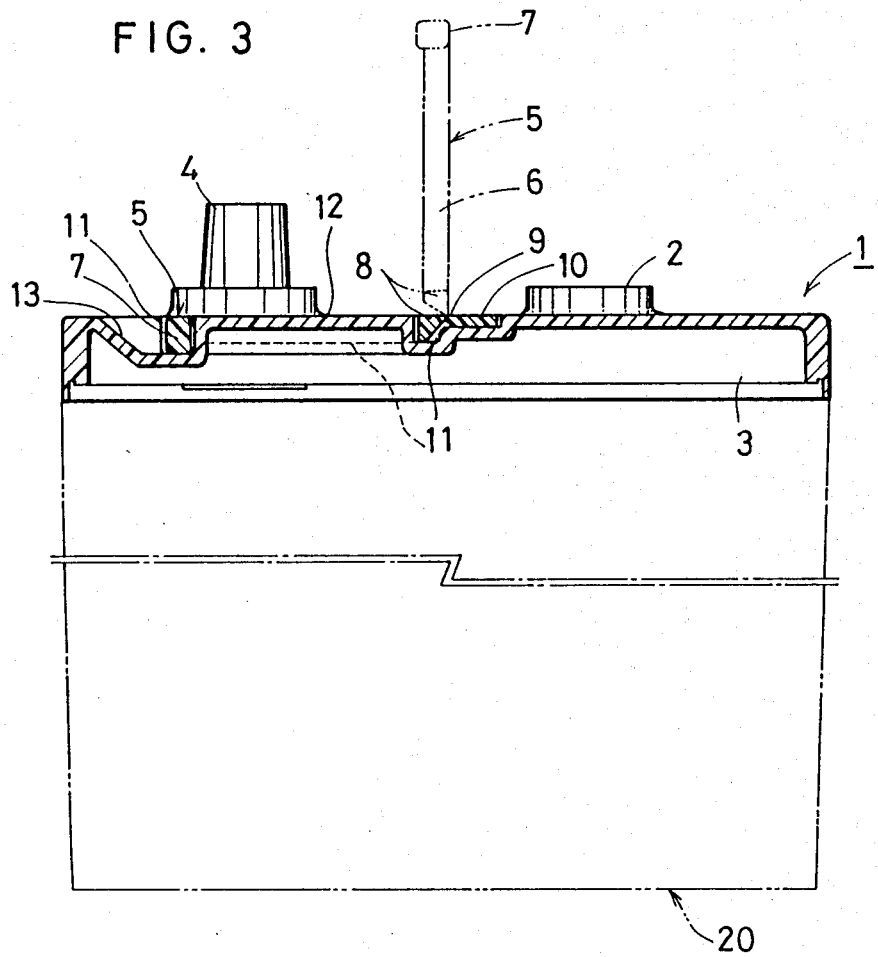
FIG. 3 is a sectional view taken along the line III—III in FIG. 1.

Referring to FIGS. 1 to 3, a lid body is for a lead storage battery casing has, for example, six liquid ports 2 for the respective battery compartments. However, such liquid ports 2 are not provided in the case of an enclosed type or sealed storage battery. The lower side of the lid body 1 is provided with partition walls 3 corresponding to the partition walls of a battery casing 20 shown in phantom lines in FIGS. 2 and 3. The arrangement described so far is the same as in a conventional storage battery.

The lid body 1 of the storage battery has a handle 5 attached thereto. The handle 5, as its entire shape is shown in FIG. 1, has two leg portions 6, a grip portion 7 connecting the upper ends of the leg portions 6, and an attachment side connecting portion 8 connecting the lower ends of the leg portions 6, and a hinge 9 is formed along the lower end edge of the attachment side connecting portion 8. In FIG. 1, the hinge 9 actually will hardly be visible, but the hinge 9 is shown as a region defined between two parallel straight lines for the sake of a convenient illustration. An attachment portion 10 is formed on the side opposite to the side where the grip portion 7 is formed.

The handle 5 described above can be made of any desired resin material; for example, it is made of such resin as polypropylene, polyethylene or polyamide.

As best shown in FIG. 3, the hinge 9 has a thin-walled portion and is made bendable by utilizing the flexibility possessed by the resin described above.

The lid body can also be made of any desired resin material; for example, it is made of such resin as polypropylene, or acrylonitrile butadiene styrene resin. The handle 5 is joined to the lid body 1 at the attachment portion 10 by such means as welding, ultrasonic welding or adhesive bonding.

In this embodiment, the upper surface of the lid body 1 has a recess 11 molded therein for receiving the handle 5 as the latter is lowered to extend along the upper surface of the lid body 1. The recess 11 has a shape and size such that it also receives the attachment portion 10 so that when the handle 5 is lowered into the recess, none of the portions of the handle 5 project above the upper surface of the lid body 1. In other words, the upper surface of the lid body 1 is flush with the upwardly facing surface of the handle when the latter is in a recessed position. As best shown in FIG. 3, the grip portion 7 has its width relatively increased to facilitate gripping by hand, while the portion of the recess 11 to receive the grip portion 7 is deepened. In this embodiment, as shown in FIG. 1, in order to receive the handle 5 in the form of a rectangle as a whole and extending along the respective sides of the rectangle, the recess 11 is shaped to extend along the respective sides of the rectangle. Therefore, the region 12 surrounded by the recess 11 is made flush with the other portions of the upper surface of the lid body 1. As best shown in FIG. 1, the recess 11 defines a clearance around the periphery of the handle 5, but in order to prevent dust from entering, it is desirable that such clearance is as narrow as possible.

Further, as best shown in FIGS. 1 and 3, the grip portion 7 of the handle 5 is positioned inside the end edge of the upper surface of the lid body 1. The upper surface of the lid body 1 has with a hollow space 13 molded therein adjacent the recess 11 to laterally open a portion of the grip portion 7. The hollow space 13 makes it easier to pick up by hand the grip portion 7 fitted in the recess 11. While the hollow space 13 has been formed outside the recess 11 in the illustrated embodiment, such recess may be formed to extend to the region 12 or each of the two areas may be provided with such recess.

In such a storage battery, when it is desired to use the handle 5, the handle 5 is raised into a position shown in phantom lines in FIGS. 2 and 3 and then the grip portion 7 is griped by hand. To make it possible to suspend the storage battery with the least possible tendency to tilt when the storage battery 5 is listed by the handle 5, it is preferable to position the hinge 9 between the attachment portion 10 and the attachment side connecting portion 8 so that it is positioned in a vertical plane extending through the center of gravity of the storage battery.

When the handle 5 is not used, the handle 5 is lowered and fitted in the recess 11 as shown in FIG. 1 and in solid lines in FIGS. 2 and 3.

FIGS. 4 to 6 show a second embodiment of the invention. Since this second embodiment includes many elements common with the first embodiment described above, like reference numerals are applied to like parts to thereby omit a repetitive description.

The main features of the second embodiment shown in FIGS. 4 to 6 is that two handles 5 are symmetrically attached to the upper surface of the lid body 1. The shape or construction and the manner of attachment of each handle 5 to the lid 1 are substantially the same as in the first embodiment described above. Further, in this second embodiment, since two handles 5 are symmetrically attached to the upper surface of the lid body 1, the liquid ports 2 are arranged on and along the center line of the upper surface of the lid body 1.

In the second embodiment, the upper end edge of the grip portion 7 of each handle 5 is positioned to be exposed on the lateral or side surface of the lid body 1. That is, the recess 11 is opened at the lateral sides. For this reason, the hollow space 13 provided in the first embodiment is not necessary in the second embodiment.

In the second embodiment, when the storage battery is to be lifted using the two handles 5, they are raised as shown in phantom lines in FIGS. 5 and 6, whereupon the handles 5 may be respectively held by both hands or the grip portions 7 of the handles 5 may be drawn toward each other as shown in phantom lines in FIG. 6 and held by one hand to lift the storage battery.

Figure 7:
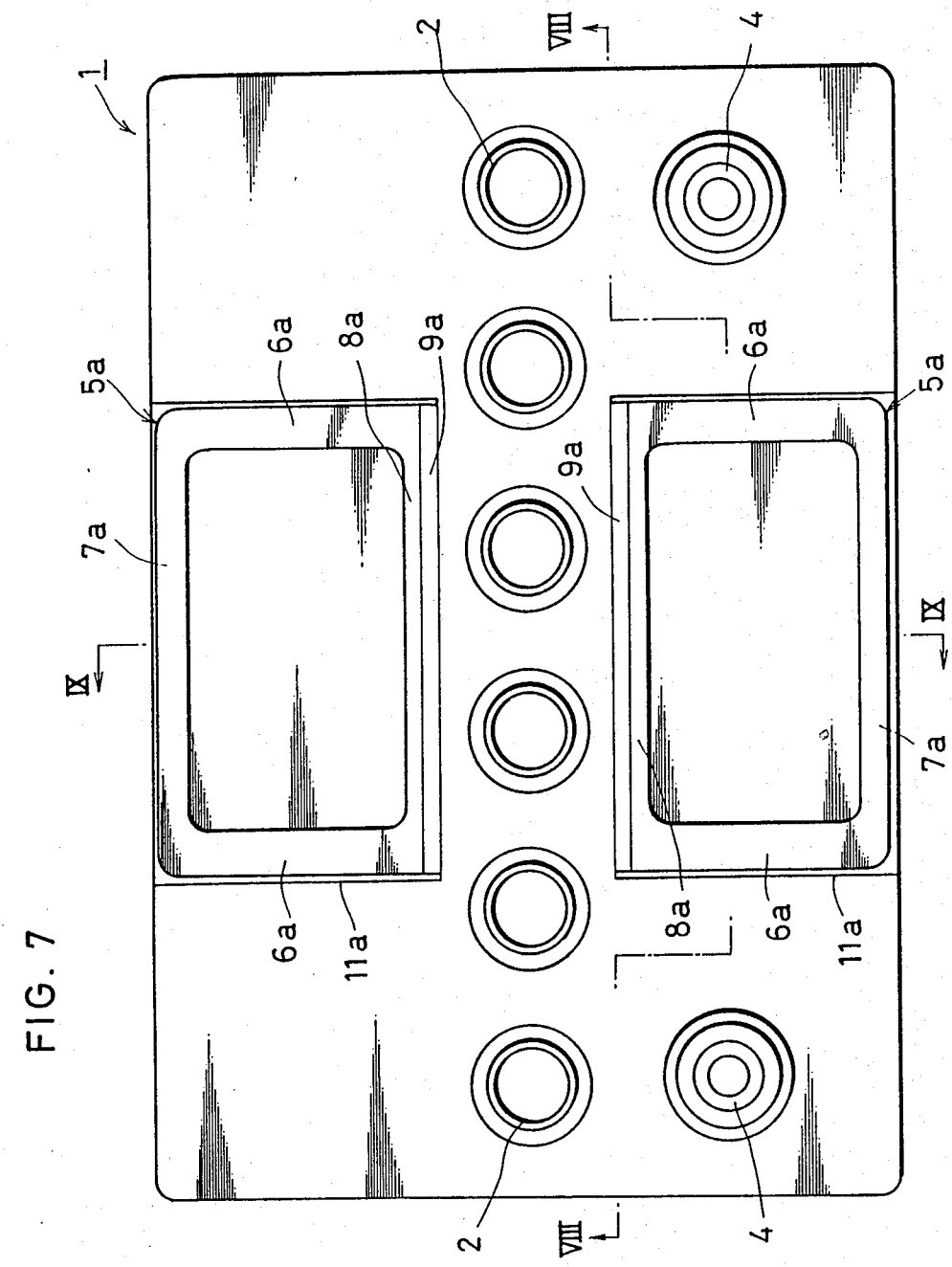
FIG. 7 is a plan view of a lid body for a storage battery showing a third embodiment of the invention.
Figure 8:
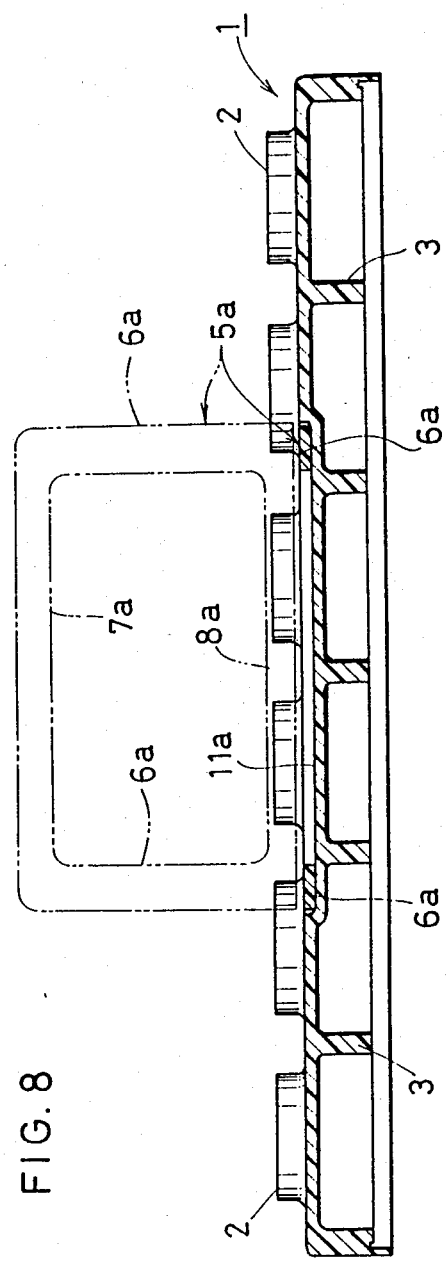
FIG. 8 is a sectional view taken along the line VIII—VIII in FIG. 7.
Figure 9:
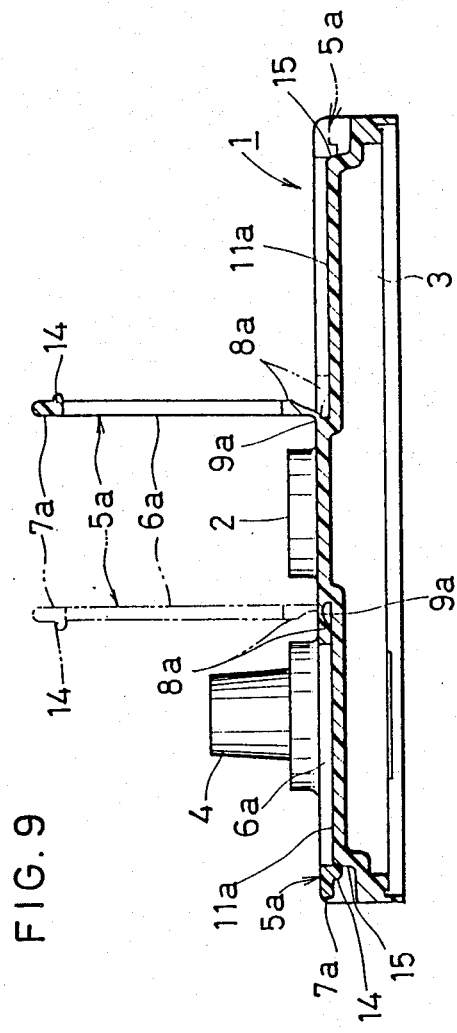
FIG. 9 is a sectional view taken along the line IX—IX in FIG. 7.

FIGS. 7 to 9 show a third embodiment of the invention. Since this third embodiment also includes many elements in common with the first or second embodiment, like reference numerals are applied to like parts to omit a repetitive description.

In the third embodiment shown in FIGS. 7 to 9, as in the second embodiment, two handles 5a are symmetrically attached to the upper surface of the lid body 1. The main features of this third embodiment is that hinges 9a each consisting of a bendable thin-walled portion are formed integral with the upper surface of the lid body 1 to extend therefrom. That is, in this embodiment, the handles 5a are formed integral with the lid body 1. For this reason, there is no portion corresponding to the attachment portion 10 forming part of the handle 5 in the first and second embodiments.

As in the preceding embodiments, each handle 5a has vertical leg portions 6a, a grip portion 7a and an attachment side connecting portion 8a, but a recess 11 for receiving each handle 5a as the latter is lowered uniformly extends to the region surrounded by the handle 5a. This is for the purpose of making it easier to mold the lid body 1 integral with the handles 5a. That is, in the case where the recess 11 is formed to surround the step portion projecting like the region 12 in the first and second embodiments, the direction of withdrawal of a metal mold is restricted to the direction perpendicular to the upper surface of the lid body 1, whereas if the recesses 11a are formed without a step portion projecting at the middle as in the third embodiment, it is also possible to select the direction of withdrawal of a metal mold so that it is parallel to the upper surface of the lid body 1. As a result, it becomes easier to form the handles 5a integral with the lid body 1.

In the case where the handles 5a are molded integral with the lid body 1 as in the third embodiment, the so-called "habit" developed in the hinges 9a after molding may act to raise the handles 5a from the upper surface of the lid body 1 as exemplified by the handle 5a shown in solid lines on the right-hand side of FIG. 9. Thus, because of this "habit" in the hinges 9a, it sometimes happens that the handles 5a cannot be kept recessed in the recesses 11a. Therefore, in this embodiment, the grip portion 7a of each handle 5a is provided with an engagement portion 14 adapted to frictionally contact the corresponding wall portion 15 of the recess 11a. The state in which the engagement portion 14 is in engagement with the wall portion 15 can be seen at the handle 5a shown in solid lines on the left-hand side of FIG. 9.

In the above description, the engagement portion 14 and wall portion 15 are adapted to frictionally engage each other. However, one of them may be formed with an undercut portion to ensure a firmer engagement therebetween.

Further, if the engagement portion 14 is made relatively long lengthwise of the grip portion 7a, it is possible to increase the width of the grip portion 7a which will come in contact with the hand, and the engagement portion 14 provides means for easy gripping by hand.

While the invention has been described with reference to three embodiments, some modifications can be made within the scope of the invention.

For example, the handle 5 has been bonded to the lid body 1 by welding; however, the handle 5 may be inserted in the metal mold in advance of molding the lid body 1, so that when the lid body 1 is molded, the handle 5 has already been joined to the lid 1.

The recess 11 or 11a has been formed so that the handle 5 or 5a, when lowered, may not project above the upper surface of the lid body 1; however, since the handle, with the hinge included, according to the invention can be formed relatively thin-walled, even if a recess is not provided, there is no possibility of the handle projecting excessively above the upper surface of the lid. Therefore, there will be no inconvenience even if the handle projects above the upper surface of the lid when it is not used.

In the embodiments described above, the hinge 9 or 9a has been formed along the attachment side connecting portion 8 or 8a. As a result, the length of the hinge 9 or 9a can be increased, contributing to increasing strength. However, if such advantage is not desired, a portion corresponding to the attachment side connecting portion may be dispensed with, and hinges may be formed directly on the lower ends of the vertical leg portions 6 or 6a.

Although the present invention has been described and illustrate in detail, it is clearly understood that the same is by way of illustration and example only and is not to be taken by way of limitation, the scope of the present invention being limited only by the terms of the appended claims.

What is claimed is:

1. A cover for an electrical storage battery, comprising a lid body (1) for closing an opening of a battery casing, said lid body having an upper surface, recess means in said upper surface of said lid body, said recess means comprising first and second recesses (11, 11a) symmetrically extending in said lid body to open upwardly and laterally outwardly into a respective lateral edge of said lid body, whereby said first and second recesses are open along the respective lateral edge of said lid body, handle means made of a resin material and including first and second handles (5, 5a) having a configuration extending symmetrically in said first and second recesses respectively when said handles are not in use, first and second hinges (9, 9a) each constructed as a bendable portion which is thinner than the respective handle and having an outer surface located at such a level that said hinges and outer surfaces of said handles extend substantially flush with each other and with said upper surface of said lid body when said handles are received in said first and second recess respectively, so that the handles and the hinges do not substantially project above said upper lid body surface, each of said handles (5, 5a) having two leg portions (6, 6a) and a grip portion (7, 7a) interconnecting said leg portions, said leg portions connecting said grip portion to the respective hinge, said leg portions having such a length that each grip portion resting in its respective recess extends along the respective lateral edge of said lid body, whereby each grip portion is laterally exposed for ready access to the handles and for lifting a battery.

2. The storage battery cover of claim 1, wherein each handle has an attachment portion which is divided by the respective hinge (9) into two sections (8, 10), one section (10) being jointed to the upper surface of said lid body inside the respective recess, the other section (8) being connected to said leg portions (6).

3. The storage battery cover of claim 1, wherein said recess has a portion for frictionally engaging a portion of said handle means to hold said handle means in said recesses when said handle means are not in use.

4. The storage battery cover of claim 1, wherein said lid body has a raised portion (12) in each of said recesses, said raised portion extending to a level so that it is flush with said upper lid body surface and with the respective handle means when the handle means are received in the recesses.

5. The storage battery cover of claim 2, comprising liquid ports arranged in a row substantially centrally between longitudinal lateral edges of said lid body, said first and second recesses and said first and second handles being arranged symmetrically relative to said row of liquid ports.

6. The storage battery cover of claim 2, wherein said thinner hinge portions (9a) connect the respective handle directly to said lid body along an edge formed by the respective recess.

* * * * *